APPARATUS FOR VARIABLE SPEED PLAYBACK OF PLURAL TRACK RECORDS

Original Filed Aug. 27, 1968 3 Sheets-Sheet 1

INVENTORS
DAVID D. PRICE JR. &
LAWRENCE R. DEBELL
BY
Dunlap, Laney & Hessin
ATTORNEYS APPARATUS FOR VARIABLE SPEED PLAYBACK OF PLURAL TRACK RECORDS
Original Filed Aug. 27, 1968 3 Sheets-Sheet 2
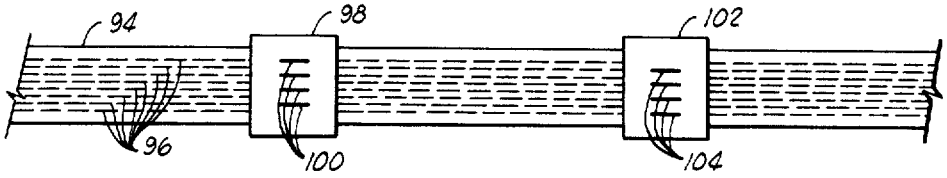
Fig. 4
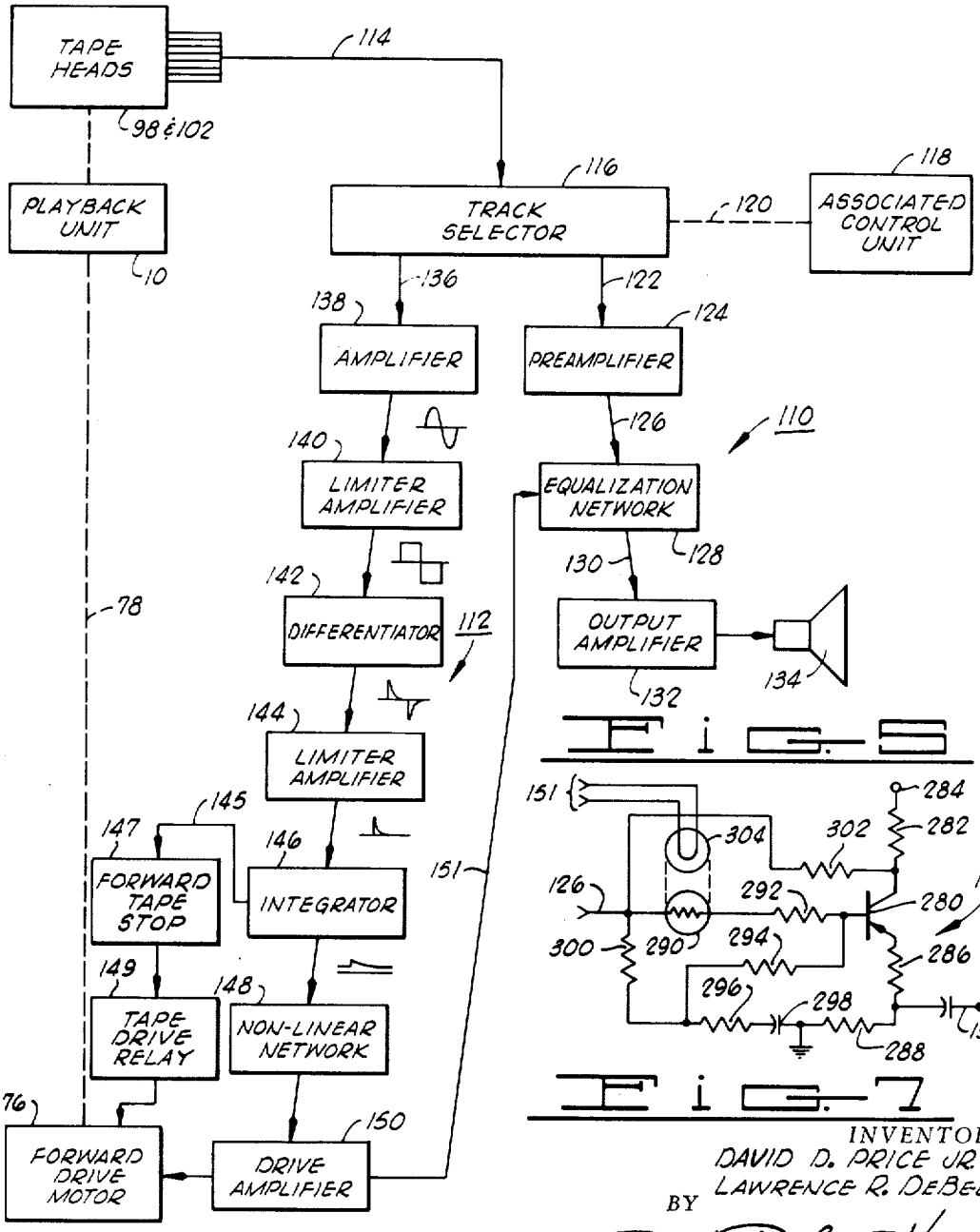
Fig. 5
Fig. 7
INVENTORS
DAVID D. PRICE JR. &
LAWRENCE R. DEBELL
BY
ATTORNEYS

APPARATUS FOR VARIABLE SPEED PLAYBACK OF PLURAL TRACK RECORDS

Original Filed Aug. 27, 1968 3 Sheets-Sheet 3

INVENTORS
DAVID D. PRICE JR. &
LAWRENCE R. DEBELL
BY
Dunlap, Laney & Hessin
ATTORNEYS United States Patent Office Re. 28,006
Reissued May 7, 1974

28,006

APPARATUS FOR VARIABLE SPEED PLAYBACK OF PLURAL TRACK RECORDS

David D. Price, Jr., Oklahoma City, and Lawrence R. De Bell, Bethany, Okla., assignors to The Economy Company, David D. Price, Jr., and Ford C. Price, all of Oklahoma City, Okla., fractional part interest to each Original No. 3,596,007, dated July 27, 1971, Ser. No. 755,573, Aug. 27, 1971. Application for reissue Apr. 27, 1972, Ser. No. 248,325

Int. Cl. G09b *5/04;* G11b *15/52*

U.S. Cl. 179—100.2 S 12 Claims

Matter enclosed in heavy brackets [ ] appears in the original patent but forms no part of this reissue specification; matter printed in italics indicates the additions made by reissue.

ABSTRACT OF THE DISCLOSURE

An apparatus for playback of plural tracks of recorded information at selectively different track record speeds, the apparatus consisting of a record playback unit capable of playing back a selected one of plural record tracks each carrying a control signal of predetermined, constant frequency, and having control circuitry for receiving playback control signal and converting it to a DC control voltage proportional to frequency for use in controlling the record playback speed of the playback unit. The DC control voltage is applied through a nonlinear network to control a drive amplier which, in turn, regulates the forward drive motor of the record playback unit to maintain the played-back control signal at is proper reference frequency value.

CROSS-REFERENCE TO RELATED APPLICATION

The subject matter of the present application is particularly related to a copending U.S. patent application Ser. No. 652,575 entitled "Method and Apparatus for Teaching," and filed on July 11, 1967 in the name of David D. Price, Jr. et al.

BACKGROUND OF THE INVENTION

(1) Field of the invention

The invention relates generally to plural record track playback apparatus and, more particularly, but not by way of limitation, it relates to improvements in plural track playback apparatus for use in the various forms of aural and visual tutoring devices.

(2) Description of the prior art

The prior art includes many and diverse types of playback control apparatus both for servocontrol of record track speed and for various forms of track selection. Such recording and playback techniques may arise in many totally unrelated technical areas, and variations in apparatus are largely induced by the limitations and exigencies existing in the respective technological areas. Thus the video recording and playback art is accompanied by a high degree of development of tape speed servocontrol apparatus since very precise speed control and scanning consistency is necessary. On the other hand, other fields such as geophysical prospecting and other scientific undertakings involving complicated systems instrumentation have brought about a highly developed art of plural track recording and various peripheral control techniques.

SUMMARY OF THE INVENTION

The present invention contemplates a plural record track playback apparatus capable of playing back different record tracks at different speeds as controlled by a track control signal of predetermined constant frequency which is recorded with each record track moving at its proper speed. In a more limited aspect, the invention consists of record playback apparatus including pickup means for reproducing the control signal from a selected record track for application through control circuitry which develops a DC control voltage proportional to the control signal frequency. The DC voltage is then applied through a nonlinearizing network to energize a drive amplifier which, in turn, controls the output rotation of a variable speed, shaded pole motor, the forward drive motor of the record playback apparatus. The constant frequency control signal is present on each record track so that playback of a selected track will reproduce the constant frequency control signal only when played at its proper speed, and frequency variations above and below, i.e. overspeed and underspeed conditions respectively, affect the control circuitry such that drive motor correction takes place.

Therefore, it is an object of the present invention to provide a plural track playback apparatus which can be rapidly controlled to reproduce any of selected record tracks at different record speeds.

It is also an object of the present invention to provide a playback unit for use in a tutoring device which is capable of reproducing a plurality of message units of the same or greatly different information capacity on the same length of record tape.

It is still further an object of this this invention to provide a plural track, variable speed playback mechanism which is economical to construct and reliable in operation.

Finally, it is an object of the present invention to provide a playback apparatus having rapid start-stop capabilities as well as plural track and speed selection advantages.

Other objects and advantages of the invention will be evident from the following detailed description when read in conjunction with the accompanying drawings which illustrate the invention.

BRIEF DESCRIPTION OF THE DRAWINGS

FIG. 4 illustrates a section of record tape in association with plural record-reproduce heads;

FIG. 5 is a block diagram of the playback apparatus including audio output circuitry and speed control circuitry;

FIG. 6 is a schematic diagram of the control circuitry of FIG. 5; and

FIG. 7 is a schematic diagram of the equalization network of FIG. 5.

DESCRIPTION OF THE PREFERRED EMBODIMENT

Figure 1:
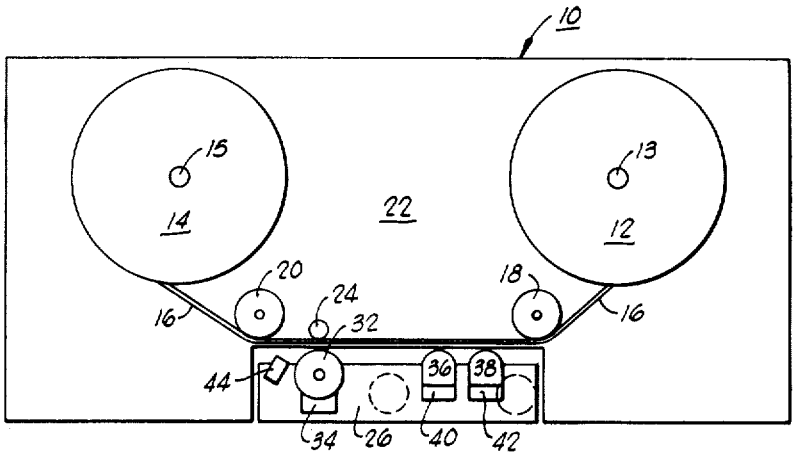
FIG. 1 is a top plan view of a playback unit as constructed in accordance with the present invention.
Figure 2:
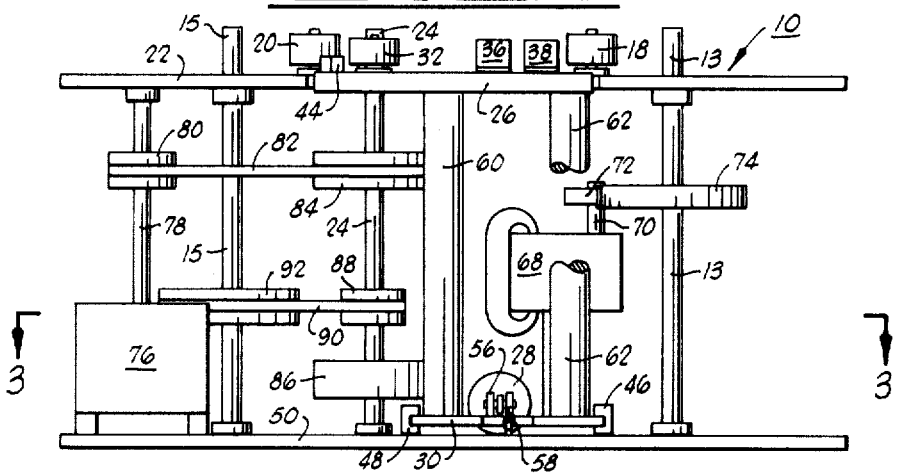
FIG. 2 is a side elevation of the playback unit of FIG. 1.
Figure 3:
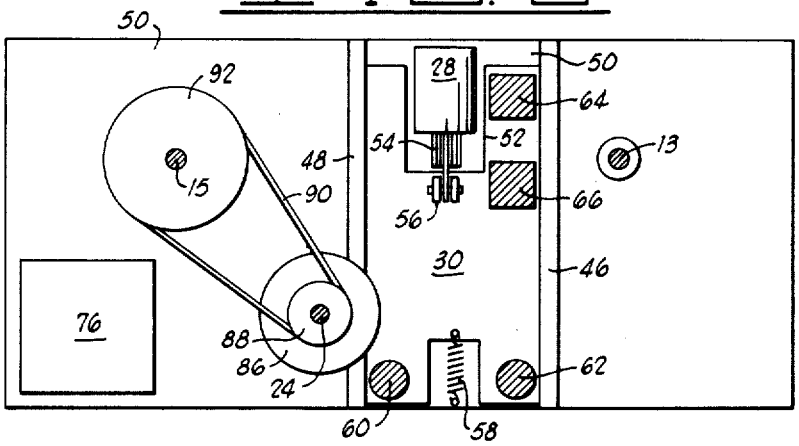
FIG. 3 is a section taken along lines 3—3 of FIG. 2.
Figure 1:
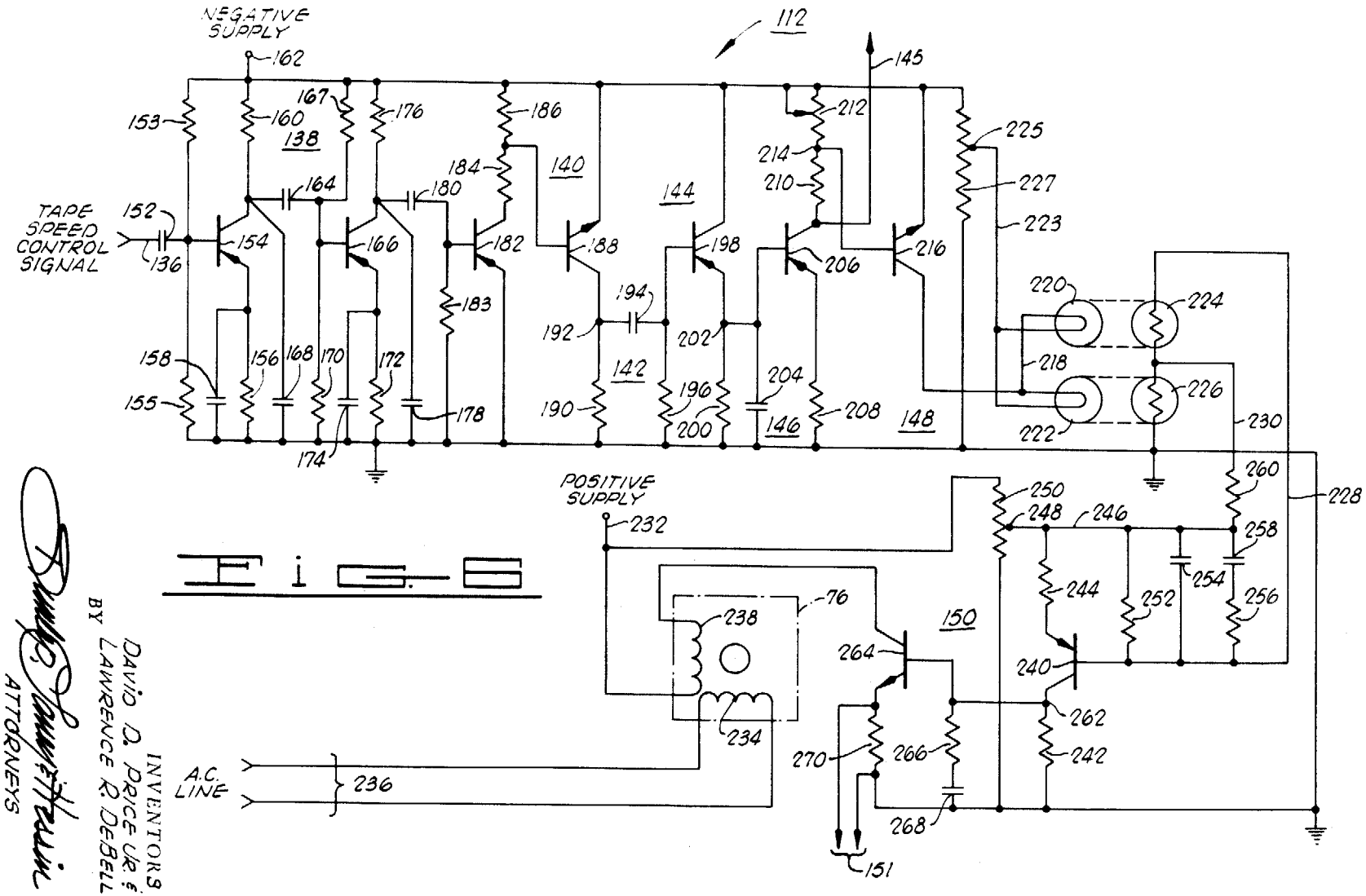

As shown in FIGS. 1, 2 and 3, a tape playback unit 10 is depicted utilizing a supply reel 12 affixed on a supply shaft 13 and a storage reel 14 on takeup shaft 15 with a record tape 16 extending therebetween. Actually the playback unit 10 has been specifically adapted to receive tape cartridges but, for purposes of explanation, conventional tape reeling is employed. A pair of idler pulleys 18 and 20 may be rotatably secured to an upper panel 22 of playback unit 10 so that tape 16 is led past a drive shaft 24. The drive shaft 24 rotates adjacent tape 16 but does not exert any moving force on tape 16 until a carriage 26 is moved inward toward tape 16.

The carriage 26 is moved by actuation of a solenoid 28 moving a slide plate 30 (FIG. 2) and this in turn, displaces the carriage 26 inward to bring an idler gear 32 to bear on tape 16 and drive shaft 24 such that the necessary friction is supplied to impart rotation to tape 16. The idler 32 may be formed of rubber or other such composition and it may be pivotally mounted on carriage 26 by a suitable bracket 34. Also, a pair of record-reproduce heads 36 and 38 are similarly mounted by respective brackets 40 and 42 so that inward movement of carriage 26 brings reproducing heads 36 and 38 into transducing contact with tape 16. A suitable photocell 44 may also be mounted on carriage 26 to perform a control function such as end of tape recognition.

Referring more particularly to FIGS. 2 and 3, the slide plate 30 is reciprocally retained within a pair of slide guides 46 and 48 which are suitably secured transversely across a lower panel 50 of playback unit 10. The solenoid 28 is then mounted securely to lower plate 50 within a cutout portion 52 of slide plate 30 to extend an armature 54 for pivotal engagement with a post 56 which is secured to the upper surface of slide plate 30. Energization of solenoid 28 causes closure or drawing in of armature 54 to cause displacement of slide plate 30. A tension spring 58 connected between lower panel 50 and slide plate 30 effects return upon release of solenoid 28.

The upper carriage 26 is rigidly supported from slide plate 30 by means of a pair of upright vertical posts 60 and 62 rigidly secured therebetween in parallel alignment. Also movably supported upon slide plate 30 by means of suitable upright posts 64 and 66 is a rewind motor 68, a suitable form of unidirectional AC motor which is employed for tape rewind. Thus, motor 68 provides rotational output on a shaft 70 to a friction gear 72 and, when rewind is enabled and solenoid 28 is deenergized to allow return of slide plate 30 by tension spring 58, the friction gear 72 is brought into rotating contact with a larger diameter friction gear 74 which, in turn, effects rewinding rotation of the supply shaft 13.

Tape drive in the forward direction is supplied by means of a unidirectional, shaded-pole motor 76 (as will be further described below). The motor 76 supplies output rotation on a drive shaft 78 which is journaled in the underside of upper panel 22 and which is connected to supply rotation to a drive pulley 80. The drive pulley 80 then transmits motion via a belt or band 82 to a pulley 84 which is connected to impart rotation to the journal tape drive shaft 24 that extends up into contact with tape 16. The lower end of tape drive shaft 24 carries a suitable damping weight 86 as well as a drive pulley 88 conveying rotational motion along a band 90 to a friction clutch 92. The friction clutch 92 is then frictionally engaged to the windup or storage shaft 15 so that continual tape windup pressure is applied.

Although various forms of recording tape and tape format or track allotment may be employed with the present playback apparatus, a form of plural track tape scheme as depicted in FIG. 4 has been employed to good advantage. This form of tape space allotment is particularly desirable for use with ¼-inch magnetic tape since space will be at a premium; however, other applications utilizing ½-inch recording tape with seven tracks or 14 recording channels is contemplated. Thus, a tape 94 may be divided into a number of longitudinal channels and for illustration purposes there are eight parallel recording channels 96 shown. A recording track may then consist of two channels 96, either adjacent or not, whereupon one channel 96 carries audio or message information while the other channel 96 includes an attendant control signal of predetermined constant frequency. A first multitrack head 98 including spaced reproducing heads 100 can be aligned to pick up only message channels of the plural record tracks, in this case four such record tracks. Then, at a slightly displaced mounting, a multitrack head 102 having plural reproducing heads 104 is aligned to transduce the respective control signal channels of each of the plural record tracks. It should be understood that this is only one scheme and that various conventional practices relating to plural track grouping and readout shall be applicable. Further, it is well within contemplation that a control signal be recorded in the same track area as message information in a demodulatable or otherwise recoverable storage for later analysis and/or related control usage.

As shown in FIG. 5, control circuitry utilized with the playback apparatus consists of audio output circuits 110 as well as speed control circuitry 112. The tape head output, e.g. as from multitrack tape heads 98 and 102, may be present via a multichannel lead or cable 114 to a track selector 116. The track selector 116 may be manually operated selector switch, or it may be operated in response to predetermined conditions prevailing in an associated control unit 118 and supplying control effect through linkage 120. For example, the associated control unit may constitute the various programming and examination control units of a tutoring device such that various interactive playback controls may then be present along linkage 120. There are, of course, various other forms of associated equipment which well may be utilized with the particular playback apparatus.

The track selector 116 effects a selection of both message information and control signal information for a given or selected record track. Thus, audio or message information is present on output lead 122 for application to a suitable preamplifier 124. The amplified output on a lead 126 is then applied to a suitable equalization network 128. Equalization network 128 may be a form of circuitry which provides compensation to give improved high frequency response at lower tape speeds as will be further described. The equalized audio signal is then applied via a lead 130 to a suitable output amplifier 132 which, in turn, drives a loudspeaker 134 or other such audible output apparatus.

The track selector 116 also supplies the related track control signal on an output 136 to an amplifier 138. The output of amplifier 138 is a sine wave at a predetermined constant frequency, i.e. when tape transport 10 is driven at the proper speed for the particularly selected record track. The pure sine wave output is then applied to a limiter amplifier 140, a conventional form of cutoff/saturation limiting amplifier or overdriven amplifier, which tends to produce a near square wave output. The square wave is conducted through a differentiator circuit 142 of short time constant to produce alternating spikes, and the differentiated output is applied through a limiter amplifier 144, a clipping amplifier, to limit its output to one polarity of voltage spikes only. These voltage spikes are then integrated in an integrator circuit 146 to obtain an average DC voltage for application to a nonlinear network 148 which controls a drive amplifier 150. The drive amplifier 150 then controls the speed of forward drive motor 76 of tape transport 10. Also, equalization feedback is provided via lead 151 from drive amplifier 150.

A second output 145 from integrator circuit 146 is applied as a control signal to a forward tape stop circuit 147. The tape stop circuit 147 then controls a tape drive relay 149 which applies energizing voltage to the forward drive motor 76. The tape stop circuit 147 may be such as a conventional transistor stage normally operating to conduct and maintain tape drive relay 149 actuated closed. Whereupon, ceasing of control tone provides signal change in the output from integrator 146 to cut off conduction of forward tape stop 146 which, in turn, causes unlatching of tape drive relay 149.

Referring now to FIG. 6, the speed control circuit 112 is represented in schematic form. The tape speed control signal is introduced on lead 136 through a coupling capacitor 152 for input to the base of a PNP-type transistor 154, the first stage of amplifier 138. The base of transistor 154 is biased between voltage divider resistors 153 and 155. The emitter of transistor 154 is connected through a resistor 156 to ground and emitter decoupling is provided by capacitor 158. The collector of transistor 154 is connected through a load resistor 160 to a negative voltage supply terminal 162, e.g. 24 volts negative DC (−24 v.). Amplifier output from transistor 154 is taken from the collector through a coupling capacitor 164 for application to the base of a PNP-type transistor 166 as biased from supply voltage by a resistor 167. A capacitor 168 provides filtering of the output from the first stage transistor 154.

The base of transistor 166 is biased through a resistor 170 while the emitter is connected through a cathode resistor 172 and a parallel decoupling 174 to ground. The collector is connected through a load resistor 176 to negative supply 162 while also receiving filtering through a capacitor 178 to ground. The output from the collector of transistor 166 is then applied through a coupling capacitor 180 for imput to the base of a PNP-type transistor 182, the first stage of the overdriven or limiter amplifier 140. The input to transistor 182 is biased by a base resistor 183 connected to ground.

The transistor 182 has its emitter connected directly to ground while the collector is connected through series resistors 184 and 186 to negative supply 162. The output is taken from the junction between resistors 184 and 186 for application directly to the base of an NPN-type transistor 188 which is connected common collector. Thus, the emitter is connected directly to the negative supply 162 while the collector is connected through resistor 190 to develop an overdriven or, effectively, a square wave output at terminal point 192 for application to the differentiating circuit 142. The output of terminal 192 is then differentiated through a capacitor 194 and resistor 196 to provide a differentiated input to the base of a PNP-type transistor 198 which also constitutes a limiter amplifier.

The limiter amplifier or transistor 198 has its emitter connected through a resistor 200 to ground while the collector is connected directly to the negative supply 162 to develop an output of negative-going spike voltage only at terminal 202. The output taken from terminal 202 is then integrated across grounded capacitor 204 to provide a relatively constant DC input on the base of a PNP-type transistor 206. The transistor 206 actually comprises the input stage of nonlinear network 148, and it has its emitter connected through a resistor 208 to ground while the collector is connected through a resistor 210 and potentiometer 202 to the negative supply 162. The potentiometer 212 is a relatively low order of resistance and provides a calibration adjustment for presetting the nonlinear network. The output 145 provides connecting of control signal to forward tape stop circuit 147 as shown in FIG. 5.

Control voltage output is taken from terminal 214 for application to the base of an NPN-type transistor 216 which is connected with the emitter tied directly to negative supply 162 and the collector tied directly to one side of a pair of parallel-connected lamps 220 and 222. The opposite side of lamps 220 and 222 is energized through a lead 223 connected to a tap junction 225 of a high wattage, wire wound resistor 227 which is connected as a voltage divider between the negative suply 162 and ground. In the case of a negative 24-volt potential supply, the taped terminal 225 is adjusted to supply negative 22 volts (−22 v. DC) on lead 223 to each of lamps 220 and 222. The lamps 220 and 222 are each paired in illuminating disposition to respective photoresistive elements 224 and 226. The photoresistive elements 224 and 226 provide a nonlinearizing effect as a relatively small change in bulb intensity will result in a large current change as between leads 228 and 230 to drive amplifier 150. The photoresistive elements 224 and 226 may be such as type CK1114 elements, or the DC energized bulbs 220 and 222 may be selected in accordance with attendant circuit parameters.

The drive amplifier 150, as well as forward drive motor 76, are energized by a positive voltage supply, e.g. plus 100 volts (+100 v.) DC as applied at positive supply input 232. The drive winding 234 of forward drive motor 76 receives AC line voltage input via leads 236, and an additional DC control winding 238 of forward drive motor 76 actually effects speed variation. The forward drive motor 76 is a variation on the standard type of shaded-pole motor, it is a variable speed, unidirectional motor which is capable of 10 to 1 speed variation under load with no loss of rated torque. One form of motor which is suitable for use is model No. M8RC5BK which is commercially available from the RMS Motor Corporation of Binghampton, N.Y. This particular motor is a variable speed, shaded-pole type having 1.7 ounce inches torque and being variable from 3,000 to 300 r.p.m. It should also be understood that various forms of variable speed DC motor may be employed.

The control voltage lead 228 from photoresistive element 224 is applied directly to the base of a PNP-type transistor 240. Transistor 240 is connected common collector through a resistor 242 to ground while the emitter is connected through a resistor 244 to a voltage supply lead 246. The voltage lead 246 is derived from an adjustable output tap 248 on voltage divider resistor 250 which is connected between positive supply 232 and ground. Thus, in the case of a plus 100-volt DC supply, the voltage supply 246 will carry about plus 12 volts (+12) DC. The voltage supply lead 246 is also connected through a biasing resistor 252 to the base of transistor 240, while a smoothing capacitor 254 is connected in parallel. A timing resistor 256 and series-connected capacitor 258 are connected between supply lead 246 and base input lead 228 while a biasing resistor 260 is connected to lead 230 to place selected potential at the junction of photoresistors 224 and 226. Resistors 252 ano 256 are selected to adjust a proper constant of nonlinearity and recovery time into the input network to transistor 240.

An output from transistor 240 is taken from the collector at terminal 262 for input to the base of an NPN-type transistor 264. The base of transistor 264 is connected through a resistor 266 and series-connected capacitor 268 to ground while the emitter is connected through a very low resistance 270, e.g. on the order of 15 ohms, to ground, and the collector is connected directly through the control winding 238 of forward drive motor 76 to the positive supply terminal 232. The resistance 270 serves to develop the equalization control voltage which is then conducted via leads 151 for input to equalization network 128.

As shown in FIG. 7, the equalization network may consist of a PNP-type transistor 280 having the collector connected through a resistor 282 to a negative voltage supply 284 and the emitter connected through series resistors 286 and 288 to ground. A base input is derived from the input lead 126 for application through a photoresistor 290 and resistor 292. The base is connected to ground through series-connected resistors 294 and 296 and a capacitor 298 while a bypass resistor 300 is connected in parallel with photoresistor 290. A resistor 302 of relatively high value is connected between the collector and input lead 126. A lamp 304 is connected to be energized by leads 151 from the drive amplifier 150 of FIGS. 5 and 6. Thus, at a lower playback speed, an increased output across resistor 270 of drive amplifier 150 lowers the resistance of photoresistor 290, this tending to shunt a more full high frequency response to output amplifier 132. The photoresistor 290 and lamp 304 may also comprise an integral unit such as the commercially available CK–1114.

OPERATION

The playback apparatus finds particular utility in applications where plural groups of message information can be stored on the same tape in selected ones of plural tracks. The particular recording scheme is especially desirable for use with tutoring devices having branching capability.

Thus, information segments having different informational content as to complexity, time-length of presentation, and other aspects tending to classify it as to intelligence graduation, can be recorded on separate record tracks for selective recall by associated equipment.

The plural record track tape 94 can be prepared in any of various ways. For example, initial recording of the tracks can be performed with commercially available peripheral equipment capable of speed-selective recording, and a predetermined constant frequency control signal, e.g. a 2-kilocycle signal, can be obtained from a conventional audio frequency generator for input to the record track control channel (in the case of individual channel recording of each record track). The control signal can be selected at any frequency; however, the 2-kilocycle value has been selected since it is optimum from the standpoint of interjecting a minimum of interference and noise effects into the message information channels while avoiding excessive cross-modulation between control signal channels. Also, it is desirable to made initial lesson recordings or recording of information and control tracks with a similar type of recording and control apparatus as described herein. This practice lessens certain effects of start-up time delay and any speed change lags so that their presence is not objectionable.

In the present example, selected for descriptive purposes only, a magnetic tape 94 having eight separate recording channels disposed thereacross is specified, the channel allotment providing two channels per record track. Each record track then carries one channel 96 for storage of message information and an adjacent channel 96 for carrying a control signal which is recorded as a predetermined, constant frequency at the proper playback speed for that particular channel of message information. Thus, the constant frequency control signal is only reproduced at or near its proper, predetermined value when the playback unit 10 is moving tape 94 (tape 16 FIG. 1) at the proper reproducing speed. Of the plurality of individual record tracks on tape 94, each of the individual record tracks can be played back at any one of four different reproducing speeds ranging over about a 10 to 1 ratio; that is, forward drive motor 76 is capable of variations from 3,000 r.p.m. down to 300 r.p.m. such that tape speeds ranging over about 23 inches per second down to 2.3 inches per second may be provided. In the case as here described, four distinct tape speeds are available but this may vary with exigencies of usage.

As shown in FIG. 5 when playback is effected, the associated control unit 118 enables a particular playback track through track selector 116. This enables a specific record track having one channel of message information and one channel of control signal of constant frequency which governs the actual playback speed. The audio or message information is conducted through preamplifier 124 and equalization network 128 for audible reproduction to output amplifier 132 and a suitable loudspeaker 134 or such. The control signal output is present from track selector 116 via lead 136 to the speed control circuits 112.

With further reference to FIG. 6, the tape speed control signal is applied into the amplifier 138, two stages of conventional audio amplification as effected by transistors 154 and 166. The amplified output is then applied through coupling capacitor 180 to a first transistor stage 182 of an overdriven amplifier or limiter amplifier 140. Transistor 182 is emitter-connected directly to ground while second stage transistor 188 is emitter-connected directly to the negative supply, and the concerted action provides a square wave output, i.e. an overdriven sine wave. This voltage is applied through a timing capacitor 194 as regulated by timing resistor 119 to differentiate the voltage into a series of alternating spikes on the base input to transistor 198.

Transistor 198 has the collector tied directly to the negative supply and a limited negative spike output can be taken from terminal 202 for input to integrator circuit 146. Thus, the capacitor 204 receives the successive spike voltages and is charged continually to provide an average DC voltage input on the base of transistor 206, the input to the nonlinear network 148. It should be understood that the average DC voltage on integrating capacitor 204 will vary about an approximate value which will exist when a proper 2-kc. control signal is present on input lead 136 to amplifier 138. Thus, in an over-speed condition, when the recorded 2-kc signal is played back to be an apparently higher frequency, there will be an increased average DC voltage on the base of transistor 206, and the converse must be true for an underspeed condition when the apparent, played-back frequency of the control signal is less than its proper 2-kc.

The nonlinear network 148 provides a means whereby a relatively small input control voltage can be employed to effect a large current change through the control winding 238 of forward drive motor 76. This is necessitated since forward drive motor 76 is a linear device and complete range of control is desirable. Thus, in either the overspeed or the underspeed conditions, as detected, it should be the function of the control circuitry to increase or decrease, respectively, the amount of DC voltage which exists across the control winding 238 of forward drive motor 76.

Considering the overspeed condition, e.g. as when track selector 116 has just enabled a slower speed playback, the average DC voltage on integrating capacitor 204 will be increased, i.e. more negative in the case of the present circuitry which employs a negative voltage supply 162. The more negative base of transistor 206 causes greater conduction therethrough to cause a more positive voltage to be applied to the base of transistor 216. Since transistor 216 is connected common collector, conduction will tend to be increased such that respective lamps 220 and 222 are increased in brightness. Thus, the attendant photoresistive elements 224 and 226 will reflect decreased resistance across the emitter-base and emitter-collector connections respectively. The change in resistance of photoresistance elements 224 and 226 provides a uniform or proportional change across all operating elements of transistor 240.

The change in intensity of lamps 220 and 222 is relatively small as effected by change in control voltage; however, the resistance change through photoresistive elements 224 and 226 is inordinately great, nonlinear in accordance with operating characteristics, and this causes a decrease in the positive voltage present at the base of transistor 240 to increase conduction therethrough. An output is taken from terminal 262, also an increasing positive voltage, which controls transistor 264 to cause increased conduction providing greater current flow through the control winding 238 of forward drive motor 76. An increase in the current through control winding 238 results in a slowing of the motor 76 such that tape playback speed is diminished and the control signal approaches its proper 2-kc. frequency value. Also, the control signal as derived and averaged in control circuit 112 once again approaches its proper DC value for maintaining correct playback speed.

Actually, the played-back control signal varies from about 1,900 cycles at the fastest playback speed, down to about 2,050 cycles at the lowest playback speed, intermediate speeds seeking proportionally different control signal frequencies. This is a relatively narrow frequency range and variations from precise 2 kc. have little or no discernible effect on fidelity of audio playback. The narrow spread of control signal frequency coupled with the ability to nolinearize the DC average control voltage enables control of playback speed over a wide range.

The playback unit 10 (FIG. 1) embodies particular structure which enables optimum plural track operation. Thus, playback is enabled by actuation of solenoid 28 to move slide plate 30 rearward, this also moving carriage 26 into operating position. This operating position places reproducing heads 36 and 38 in transducing contact with the record tape 16 while drive idler 32 forces the record tape into frictional engagement with the drive shaft 24. Playback can then continue with track selection 116 (FIG. 5) providing reproduction of a designated record track, and the speed control circuitry 112 (FIG. 5) assuring the proper record track playback speed.

When the record playback is disabled, e.g. when the 2-kc. control tone is interrupted, the solenoid 28 is deenergized to release slide plate 30 and remove carriage 26 to its standby position. This movement of slide plate 30 also draws rewind motor 68 forward such that rewind drive gear 72 bears in frictional engagement on pulley 74 to cause braking of tape supply shaft 13. Then too, when tape rewind actuation must be effected, the drive linkage is engaged and it is only necessary to energize rewind motor 68 to rewind the record tape.

The foregoing discloses novel record playback and speed control apparatus which finds particular utility in systems requiring plural track, multispeed playback. The apparatus is capable of providing audio reproduction at selectively different speeds with a rapid changeover as between record tracks, and a novel tape drive mechanism serves to effect concise starting and stopping action in each instance. Further, the apparatus achieves such improvements in operation and reliability by utilizing structure and methods which are readily availed of without excessive eonomic outlay.

While the foregoing specification describes the invention with respect to a particular number and configuration of record tracks, and while certain applications are stressed as being primarily adaptable, it should be understood that various equivalents as to multitrack recording technique, track selection, assigned control signals, etc. may be utilized while keeping within the necessary confines of the present invention. Further, while the apparatus finds particular utilization with tutoring devices, it is contemplated that there may be very many applications of both analog and digital recording which may utilize similar forms of plural speed record playback.

Changes may be made in the combination and arrangement of elements as heretofore set forth in the specification and shown in the drawings; it being understood that changes may be made in the embodiments disclosed without departing from the spirit and scope of the invention as defined in the following claims.

What we claim is:

1. Playback apparatus for receiving a plural track record and reproducing a selected one of the plural record tracks, said plural record tracks being recorded at a selected one of a plurality of different recording speeds and each record track consisting of a first record channel carrying message information and a second recorder channel having a predetermined constant frequency control signal recorded thereon, said predetermined frequency being the same for all such record channels, the apparatus comprising:

transport means movable supporting said plural track record;

drive motor means including a speed control winding which is energizable to drive said transport and move said record at any of said plurality of different speeds;

pickup means including a plurality of pickup heads positioned in transducing relationship to respective ones of said plural record tracks, and track selection means receiving output signals from each of said pickup heads to provide a control signal output from the second record channel of a selected one of said plural record tracks;

frequency to voltage converter means receiving said control signal output from the pickup means and generating an output DC voltage which varies in proportion to the instantaneous reproduced frequency of said control signal output; and nonlinear circuit means receiving said output DC voltage and providing an output motor control voltage which varies as a function of said DC voltage for application to said drive motor means speed control winding thereby to regulate the drive motor means speed and record playback speed to that speed of said plurality of different speeds which is correct for proper speed reproduction and playback of the selected one of said control signal second channels and the respective message.

2. Apparatus as set forth in claim 1 wherein said frequency to voltage converter means comprises:

amplifier means receiving said control signal and generating a sine wave output;

overdriven amplifier means receiving said sine wave output to generate a square wave output; differentiator means receiving said square wave output and providing an output of alternating spike voltages;

integrating means for averaging all spike voltages of the same polarity to derive a DC control voltage which varies in proportion to the frequency of said control signal.

3. Apparatus as set forth in claim 1 wherein said nonlinear means comprises:

amplifier means receiving said DC control voltage and providing an amplified output signal;

lamp means having its illumination controlled by said amplifier output control voltage;

photoresistive means illuminated by said lamp means;

reactance means including said photoresistive means in the input circuit, said reactance means conducting in accordance wtih resistance variation of said photoresistive means; and means applying the output of said reactance means to said drive motor means to control the output rotation thereof.

4. Apparatus as set forth in claim 1 wherein said transport means comprises:

chassis means including upper and lower panel means;

means for receiving said plural track record at a record drive position on said upper panel of the chassis means;

drive shaft means journaled in said lower panel and extending through said upper panel adjacent said record drive position;

drive pulley means transmitting output rotation from said drive motor means to said drive shaft means; and carriage means including friction pulley means having said pickup means affixed thereon, said carriage means being supported adjacent said record drive position such that said friction pulley means is brought to bear against said record and record tape drive shaft to impart movement to said record.

5. Apparatus as set forth in claim 4 which is further characterized to include:

solenoid means including a coil and a retractable armature, said coil being secured to the lower panel of said chassis means and said armature being connected to said carriage means, said solenoid means being energizable to control positioning of said carriage means into operating relationship where said friction pulley means is brought to bear against said record and said record drive shaft.

6. Apparatus as set forth in claim 5 which is further characterized to include:

rewind motor means secured beneath said upper panel means for movement with said carriage means; and linkage means transmitting rewind rotation to said record when said solenoid means is deenergized.

7. Apparatus as set forth in claim 1 wherein said pickup means comprises:

a plurality of pickup heads disposed in transducing relationship to each of said first and second record channels;

audible output means; and conductive means energized by said track selection means to apply the selected first record channel pickup head output to said audible output means simultaneously with providing said control signal output of the related second record channel to said frequency to voltage converter means.

8. Apparatus as set forth in claim 7 wherein said audible output means comprises:

speaker means for reproducing an audible message;

reactance means providing an audio output for driving said speaker means; and an equalizing network receiving said first output signal from the track selector means and providing an input control to voltage to said reactance means.

9. Apparatus as set forth in claim 8 wherein said equalizing network comprises:

photoresistive means connected to receive said first output signal thereacross;

lamp means contiguous to said photoresistive means and energized in proportion to said drive motor means so that an increase in high frequency components is realized at lower playback speeds.

*10. Apparatus for playback of plural track records wherein each of said plural track records is recorded at differing speeds to carry audio information and the same constant frequency speed control signal, the apparatus comprising:*

*transport means including drive means for moving said record for playback at any one of said differing speeds;*

*pick-up means positioned in transducing relationship to said record and providing audio information output and speed control signal output for a selected record track;*

*circuit means receiving said speed control signal for amplification and integration to derive a DC average control voltage;*

*amplifier means receiving said DC average control voltage to provide an amplified output control voltage;*

*lamp means having illumination controlled by variations in said amplifier output control voltage;*

*photo-resistive means illuminated by said lamp means;*

*reactance means including said photo-resistive means in the input circuit, said reactance means conducting in accordance with resistance variation of said photo-resistive means; and*

*means supplying the output of said reactance means to said drive means to control output rotation and record speed.*

*11. Apparatus as set forth in claim 10 wherein said circuit means comprises:*

*amplifier means receiving said speed control signal and generating a square wave output;*

*differentiator means receiving said square wave and providing an alternating spike voltage output; and*

*integrating means receiving said spike voltage to generate said DC average control voltage.*

*12. Apparatus as set forth in claim 10 wherein said drive means is further characterized as being an electric motor including an energizing winding and a drive control winding, said drive control winding being energized by output from said non-linear circuit means.*

References Cited

The following references, cited by the Examiner, are of record in the patented file of this patent or the original patent.

UNITED STATES PATENTS

| | | | |
|---|---|---|---|
| 3,350,511 | 10/1967 | Johnson | 179—100.2 S |
| 2,576,424 | 11/1951 | Sunstein | 179—100.2 S |
| 2,493,755 | 1/1950 | Ferrill | 179—100.2 S |
| 2,496,103 | 1/1950 | Neufeld | 179—100.2 S |
| 3,185,970 | 5/1965 | Cromleigh et al. | 179—100.2 MI |
| 2,790,643 | 4/1957 | Gedde et al. | 179—100.2 S |
| 2,876,004 | 3/1959 | Sink | 226—42 |
| 2,886,757 | 5/1959 | Johnson | 318—328 |
| 3,234,447 | 2/1966 | Sauber | 318—328 |
| 3,350,511 | 10/1967 | Johnson | 179—100.2 |
| 3,439,127 | 4/1969 | Weigel | 179—100.2 S |
| 3,458,792 | 7/1969 | Jabber | 318—341 |

VINCENT P. CANNEY, Primary Examiner

R. S. TUPPER, Assistant Examiner

U.S. Cl. X.R.

179—100.2 MD